(12) United States Patent
Crepas et al.

(10) Patent No.: US 11,498,362 B2
(45) Date of Patent: Nov. 15, 2022

(54) TONE WHEEL ASSEMBLY, AN AXLE ASSEMBLY MADE THEREWITH, AND A METHOD OF MANUFACTURING AN AXLE ASSEMBLY

(71) Applicant: Dana Heavy Vehicle Systems Group, LLC, Maumee, OH (US)

(72) Inventors: Robert E. Crepas, Delta, OH (US); Aaron D. Gries, Perrysburg, OH (US); Mark W. Leber, Holland, OH (US); Jared T. Reichert, Pemberville, OH (US); Adam S. Erickson, Toledo, OH (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 439 days.

(21) Appl. No.: 16/713,214

(22) Filed: Dec. 13, 2019

(65) Prior Publication Data

US 2021/0180993 A1 Jun. 17, 2021

(51) Int. Cl.
*B60K 17/16* (2006.01)
*B60B 35/18* (2006.01)
*B60B 35/14* (2006.01)

(52) U.S. Cl.
CPC .............. *B60B 35/18* (2013.01); *B60B 35/14* (2013.01); *B60K 17/165* (2013.01)

(58) Field of Classification Search
CPC ......... B60B 35/18; B60B 35/14; B60B 35/12; B60K 17/165
See application file for complete search history.

(56) References Cited

U.S. PATENT DOCUMENTS

| | | | |
|---|---|---|---|
| 3,772,547 A | 11/1973 | Abate | |
| 4,090,592 A | 5/1978 | Jovick | |
| 4,953,670 A | 9/1990 | Chemelewski | |
| 5,915,513 A | 6/1999 | Isley, Jr. | |
| 6,251,045 B1 | 6/2001 | Oliveira | |
| 8,167,762 B2* | 5/2012 | Zink | B60T 8/329 |
| | | | 475/230 |
| 9,207,102 B2 | 12/2015 | Metzger | |
| 10,613,111 B2* | 4/2020 | Buchwitz | G01P 3/488 |
| 2016/0047450 A1* | 2/2016 | Steidl | B60K 17/165 |
| | | | 475/230 |
| 2016/0299169 A1 | 10/2016 | Heuver | |

FOREIGN PATENT DOCUMENTS

EP 1094253 4/2001
GB 2524819 10/2015

* cited by examiner

*Primary Examiner* — Justin Holmes
(74) *Attorney, Agent, or Firm* — Marshall & Melhorn, LLC (57) ABSTRACT

A tone wheel assembly includes a tone wheel. A first member is attached to the tone wheel. A second member is at least partially disposed around a portion of the first member. The second member includes a collar portion, one or more first leg portions extending axially from the collar portion, and one or more second leg portions extending axially from the collar portion. The one or more first leg portions include a first leg portion protuberance that extends radially from an outer surface of the one or more first leg portions. The one or more second leg portions include a second leg portion protuberance that extends radially from an outer surface of the one or more second leg portions.

18 Claims, 10 Drawing Sheets

TONE WHEEL ASSEMBLY, AN AXLE ASSEMBLY MADE THEREWITH, AND A METHOD OF MANUFACTURING AN AXLE ASSEMBLY

BACKGROUND

The invention relates to a tone wheel assembly. Also, the invention relates to an axle assembly made with the tone wheel assembly.

Tone wheels are often located in, or adjacent, the wheel end. Being located near a wheel end may create interference issues during service and exposes the tone wheel and tone wheel sensor to debris, which can cause damage to the tone wheel. In other designs, the tone wheel can be installed inboard of the wheel end. However, installing the tone wheel in an inboard location traditionally adds cost and complexity to the manufacture and service of the axle assembly.

Thus, it would be desirable to provide an assembly that allows the tone wheel to be installed inboard of the wheel end and within the axle housing and that does not add complexity to the service or manufacture of an axle assembly. A method of manufacturing such an axle assembly would also be desirable.

SUMMARY

Embodiments of a tone wheel assembly are provided. In an embodiment, the tone wheel assembly comprises a tone wheel. A first member attached to the tone wheel. A second member is at least partially disposed around a portion of the first member. The second member comprises a collar portion, one or more first leg portions extending axially from the collar portion, and one or more second leg portions extending axially from the collar portion. The one or more first leg portions include a first leg portion protuberance that extends radially from an outer surface of the one or more first leg portions. The one or more second leg portions include a second leg portion protuberance that extends radially from an outer surface of the one or more second leg portions.

Embodiments of a method of manufacturing an axle assembly are also provided. In an embodiment, the method comprises providing a tone wheel assembly. The tone wheel assembly comprises a portion having one or more first leg portions and one or more second leg portions. The one or more first leg portions include a first leg portion protuberance that extends radially from an outer surface of the one or more first leg portions. The one or more second leg portions include a second leg portion protuberance that extends radially from an outer surface of the one or more second leg portions. The tone wheel assembly is attached to a portion of an axle assembly comprising an inner lip. The first leg portion protuberance is positioned on an inboard side of the inner lip and the second leg portion protuberance is positioned on an outboard side of the inner lip.

BRIEF DESCRIPTION OF THE SEVERAL VIEWS OF THE DRAWINGS

The above will become readily apparent to those skilled in the art from the following detailed description when considered in the light of the accompanying drawings in which.

DETAILED DESCRIPTION

It is to be understood that the invention may assume various alternative orientations and step sequences, except where expressly specified to the contrary. It is also to be understood that the assemblies, devices, and methods illustrated in the attached drawings, and described in the following specification are simply exemplary embodiments of the inventive concepts. Hence, specific dimensions, directions, or other physical characteristics relating to the embodiments disclosed are not to be considered as limiting, unless expressly stated otherwise.

Figure 1:
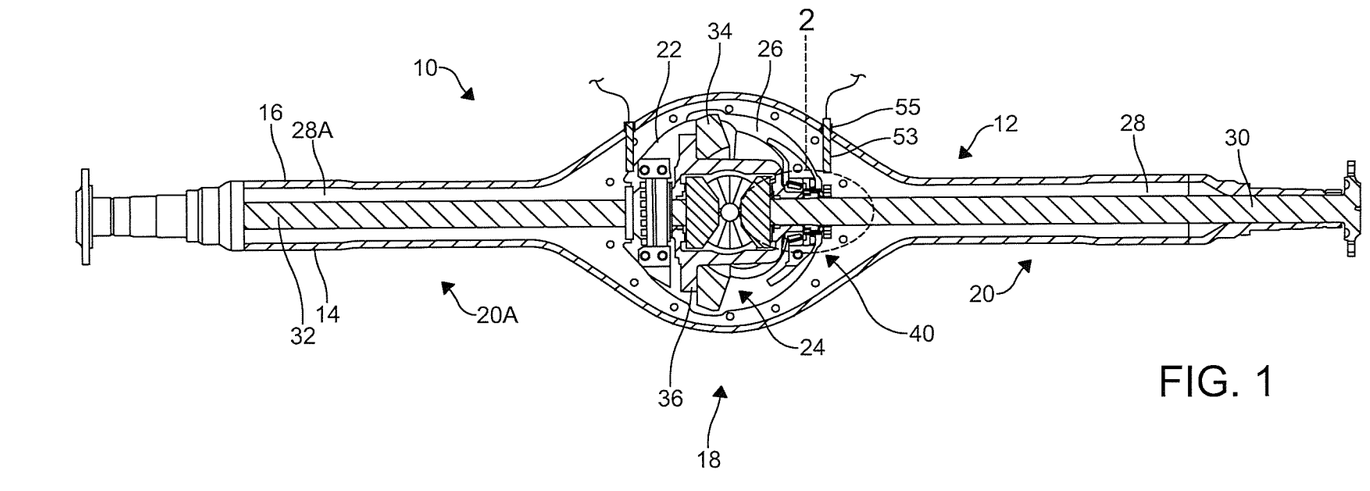
FIG. 1 is a partial sectional view of an embodiment of an axle assembly in accordance with the invention.

Embodiments of an axle assembly 10 are illustrated in FIG. 1. Each embodiment may have applications in commercial vehicles, both light duty and heavy duty vehicles, and for passenger, off-highway, and sport utility vehicles. Additionally, each embodiment of the axle assembly 10 may be adapted for use in front and/or rear driving axles, and steerable and non-steerable axles. It would be understood by one of ordinary skill in the art that the axle assembly 10 described herein may also have industrial, locomotive, military, agricultural, and aerospace applications.

Referring now to FIG. 1, the axle assembly 10 comprises an axle housing 12. The axle housing 12 may receive various components of the axle assembly 10. Further, the axle housing 12 may include multiple components that are assembled together in a suitable manner.

In some embodiments, the axle housing 12 may include a first housing 14 and a second housing 16. The first housing 14 and the second housing 16 may cooperate to define a center portion 18 and two arm portions 20, 20A. The first housing 14 and the second housing 16 may be opposing halves of the axle housing 12. In an embodiment, the first housing 14 is disposed below the second housing 16. Thus, the first housing 14 may be a lower housing member and the second housing 16 may be an upper housing member. The first housing 14 and the second housing 16 may be assembled together. Assembly of the first housing 14 and the second housing 16 may be done in any suitable manner. In these embodiments, the axle housing 12 may be of the banjo variety. Alternatively, in some embodiments (not depicted), the axle housing may be of the Salisbury variety.

The center portion 18 may be disposed near the center of the axle housing 12. The center portion 18 may define a cavity 22 that receives at least a portion of a differential 24. A differential carrier portion 26 may be disposed in the center portion 18. The differential carrier portion 26 may be coupled to the center portion 18 by fasteners or in another suitable manner. Components of the differential 24 may be disposed within the differential carrier portion 26.

The one or more arm portions 20, 20A extend from the center portion 18. In an embodiment, the one or more arm portions may comprise a first arm portion 20 and a second arm portion 20A. The first arm portion 20 and the second arm portion 20A may extend from the center portion 18 in opposite directions. One or more portions of the first arm portion 20 may be formed in a unitary manner with the center portion 18. Also, one or more portions of the second arm portion 20A may be formed in a unitary manner with the center portion 18. In certain embodiments, each arm portion 20, 20A defines an arm cavity 28, 28A. Preferably, each cavity 28, 28A receives an axle shaft 30, 32.

The differential 24 may be disposed in the axle housing 12. The differential 24 is configured to transmit torque to the wheel assemblies (not depicted) and permits rotation of the wheel assemblies at different velocities. An input yoke may enable coupling of the axle assembly to a torque source. For example, the input yoke (not depicted) may be coupled to a drive shaft (not depicted). The input yoke may be disposed on an input shaft (not depicted). The input shaft may be rotatably supported by one or more bearings (not depicted). The one or more bearings may be disposed on the differential carrier portion 26. Torque that is provided to the input yoke may be transmitted to a ring gear 34 through a pinion gear (not depicted). Torque may be transmitted from the ring gear 34 through the differential 24 to each axle shaft 30, 32. Torque is transmitted from each axle shaft 30, 32 to a corresponding wheel assembly.

The differential 24 comprises a differential housing 36 and a plurality of gears within the housing 36. The ring gear 34 is secured to the differential housing 36. The gears are typically at least one side gear and at least one pinion gear. A first end of each axle shaft 30, 32 is connected to one of the side gears. Each axle shaft 30, 32 has a substantially constant outer diameter, except adjacent a tone wheel assembly 40. Although the tone wheel assembly 40 will be described below in relation to only one axle shaft 30, it should be appreciated that the embodiments described below are applicable to both axle shafts 30, 32.

Figure 2:
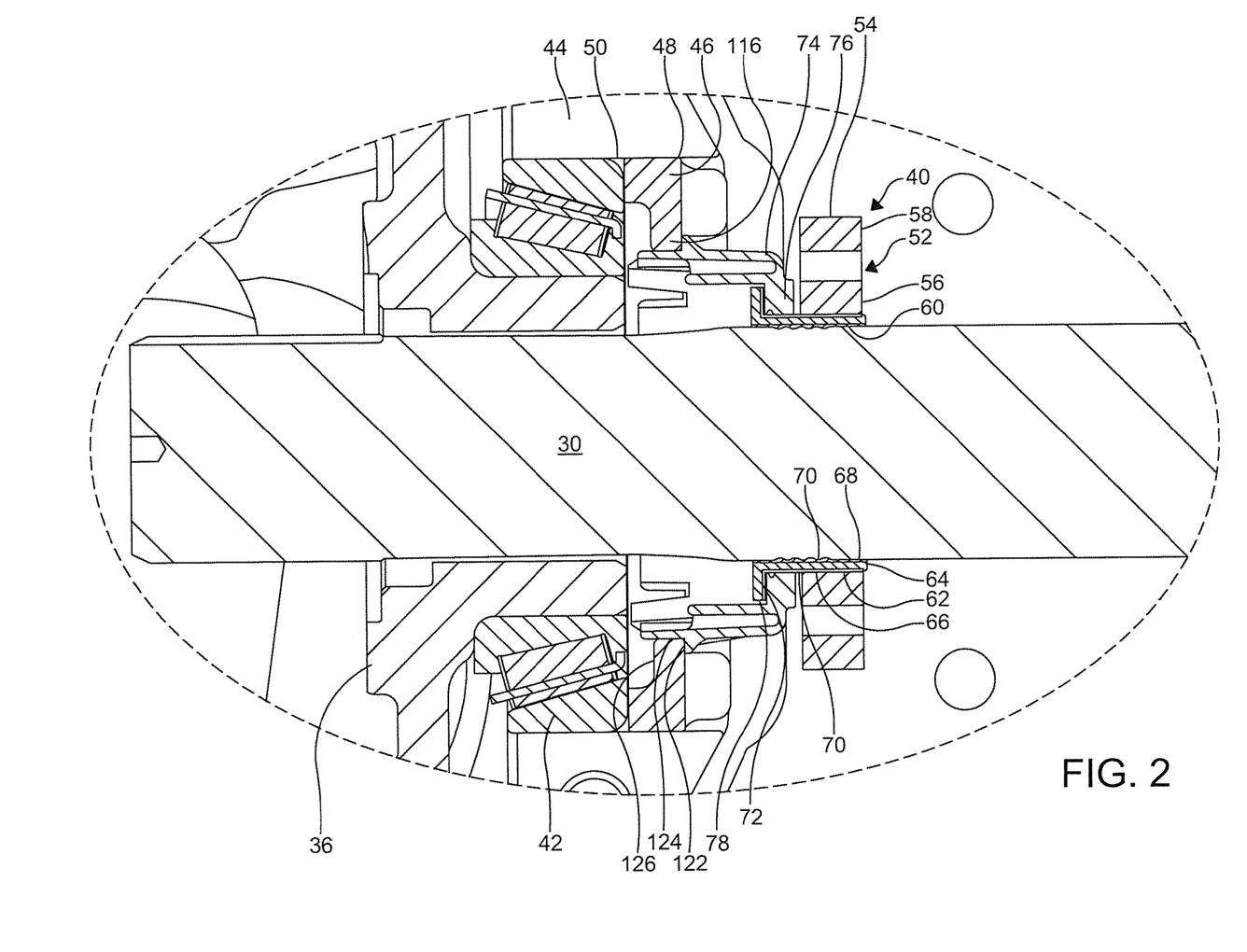
FIG. 2 is an enlarged view of a portion of the axle assembly of FIG. 1.
Figure 3:
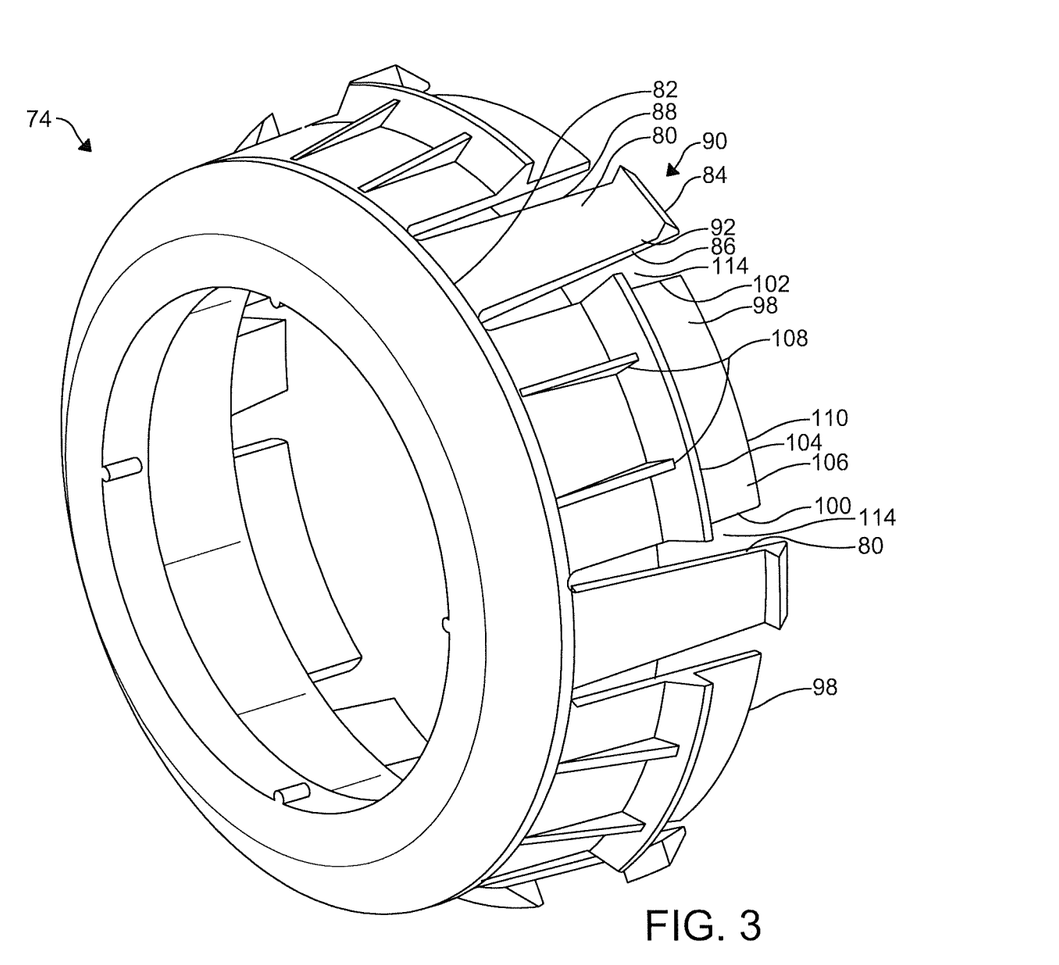
FIG. 3 is a front perspective view of an embodiment of a portion of a tone wheel assembly in accordance with the invention.

As illustrated best in FIG. 2, radially inward from the tone wheel assembly 40, the outer diameter of the shaft 30 increases. Differential bearings 42 are located between the differential housing 36 and the differential carrier portion 26. In some embodiments, a bearing cap 44 may be disposed around a differential bearing 42 to secure the differential bearing 42 to the differential housing 36. In other embodiments, a bearing cap 44 may be disposed around each differential bearing 42 to secure the differential bearing 42 to the differential housing 36. In still other embodiments, like the one illustrated in FIG. 7, a portion 45 of the differential carrier portion 26 is disposed around a differential bearing 42 to secure the differential bearing 42 to the differential housing 36.

A bearing adjuster 46 may be threadably attached at its outside surface 48 to an inside surface 50 of each bearing cap 44. The axial position of a bearing adjuster 46 can be changed by rotating the adjuster 46 toward or away from its respective differential bearing 42. Preferably, each bearing adjuster 46 is utilized to preload a differential bearing 42. Additionally, a bearing adjuster 46 can be utilized to adjust the backlash on the differential bearing 42. The bearing adjuster 46 is in contact with its respective differential bearing 42 during preload or an adjustment to the backlash of the bearing 42.

After the backlash and preload on a differential bearing 42 has been set, the tone wheel assembly 40 is installed. The tone wheel assembly 40 may comprise a tone wheel 52. As illustrated in FIG. 1, a tone wheel sensor 53 may sense the rotation of tone wheel teeth 54 through changes in a magnetic field or by another method. The sensed information is utilized to calculate wheel speed. The tone wheel sensor 53 may be removably positioned in a sensor mount 55. The sensor mount 55 may be attached to the axle housing 12 or another member of the axle assembly 10.

Referring back to FIG. 2, in some embodiments, the tone wheel 52 has at least two spokes (not depicted) that extend radially outward from an inner portion 56 of the tone wheel 52. In these embodiments, the spokes support tone wheel teeth 54, which are formed on an outer portion 58 of the tone wheel 52. The tone wheel teeth 54 are positioned adjacent the tone wheel sensor 53. The tone wheel teeth 54 may define an outer diameter of the tone wheel 52. In some embodiments, the outer diameter of the tone wheel 52 is greater than an inner diameter defined by the bearing adjuster 46.

In some embodiments, the tone wheel 52 is attached to a first member 60. In these embodiments, the first member 60 is utilized to connect the tone wheel 52 to the axle shaft 30 for rotation therewith. More particularly, in some embodiments, the tone wheel 52 has an inner surface 62 that is attached to a first wall portion 64 of the first member 60. In an embodiment, the tone wheel 52 may be pressed onto an outer surface 66 of the first wall portion 64.

In some embodiments, the first wall portion 64 is of a cylindrical shape. In one embodiment, the first wall portion 64 surrounds a portion the axle shaft 30. More particularly, an inner surface 68 of the first wall portion 64 may be in contact with a portion of the outer surface of the axle shaft 30. In this embodiment, the first wall portion 64 may extend parallel to the outer surface of the axle shaft 30. One or more grooves 70 may be formed in the inner surface 68 of the first wall portion 64. The one or more grooves 70 may each extend in a circumferential direction and be provided in a parallel relationship with each other. The one or more grooves 70 help to prevent slip between the tone wheel assembly 40 and the axle shaft 30.

A second wall portion 72 of the first member 60 extends transverse the first wall portion 64 on an end thereof. The second wall portion 72 extends radially outward from the first wall portion 64. In some embodiments, the second wall portion 72 is annular. When the tone wheel assembly 40 is installed, the second wall portion 72 may act as a dam that prevents lubricant from flowing out of the tone wheel assembly 40, which directs lubricant into the differential housing 36 and to the differential bearing(s) 42.

Each wall portion 64, 72 may comprise a metallic portion formed by stamping or another process. The first wall portion 64 and at least a portion of the second wall portion 72 may also comprise an elastomeric material. The elastomeric material may be bonded to the metallic portion. The elastomeric material may be utilized to secure the first wall portion 64 to the outer surface of the axle shaft 30. Thus, the elastomeric material helps to prevent the tone wheel 52 from rotating independently from the axle shaft 30. Additionally, the elastomeric material helps to prevent the tone wheel 52 from moving in an outboard axial direction and ensures accurate tone wheel measurements by the tone wheel sensor 53. In other embodiments (not depicted), the tone wheel may be connected to the axle shaft directly. For example, the tone wheel may be connected to the axle shaft by way of a splined connection.

Referring now to FIGS. 2-8, the tone wheel assembly 40 comprises a second member 74. A portion of the second member 74 may be disposed around a portion of the first member 60. More particularly, the second member 74 may comprise a collar portion 76 that is disposed around a portion of the first wall portion 64. Preferably, once installed, the second member 74 does not rotate during operation of the axle assembly 10. Thus, the first member 60 and the tone wheel 52 rotate relative to the second member during operation of the axle assembly 10.

Preferably, the collar portion 76 is annular. In an embodiment, the collar portion 76 defines an inner diameter. In this embodiment, the inner diameter of the collar portion 76 is greater than an outer diameter of the first wall portion 64, which is defined by the outer surface 66 thereof. Preferably, the inner diameter of the collar portion 76 is less than an outer diameter 78 of the second wall portion 72.

In some embodiments, the collar portion 76 is positioned axially between the tone wheel 52 and the second wall portion 72. Positioning the collar portion 76 between the second wall portion 72 of the first member 60 and the tone wheel 52 secures the second member 74 to the first member 60. Further, the relationship between the collar portion 76 and the second wall portion 72, restricts axial movement of the first member 60, and the tone wheel 52 attached thereto. Thus, the second member 74 helps to ensure accurate tone wheel measurements by the tone wheel sensor 53. It should also be noted that the configuration and position of the collar portion 76 enables the first member 60 to rotate with the tone wheel 52 and relative to the second member 74.

One or more first leg portions 80 extend in an axial direction from the collar portion 76. Preferably, the one or more first leg portions 80 comprise a plurality of first leg portions. As illustrated, each first leg portion 80 provided may be similarly configured. Thus, for describing certain embodiments, only one first leg portion 80 may be described below.

In some embodiments, the width of the first leg portion 80 gradually decreases. In one such embodiment, the width of the first leg portion 80 gradually decreases in an axial direction from a first end 82 to a second end 84. In this embodiment, the first end 82 may have a first width and the second end 84 may have a second width such that the first width is greater than the second width. Additionally, in some embodiments, the thickness of the first leg portion 80 gradually decreases. In one such embodiment, the thickness of the first leg portion 80 gradually decreases from the first end 82 to the second end 84. In this embodiment, the first leg portion 80 may have a first thickness at the first end 82 and a second thickness at the second end 84. In these embodiments, the first thickness is greater than the second thickness.

Figure 4:
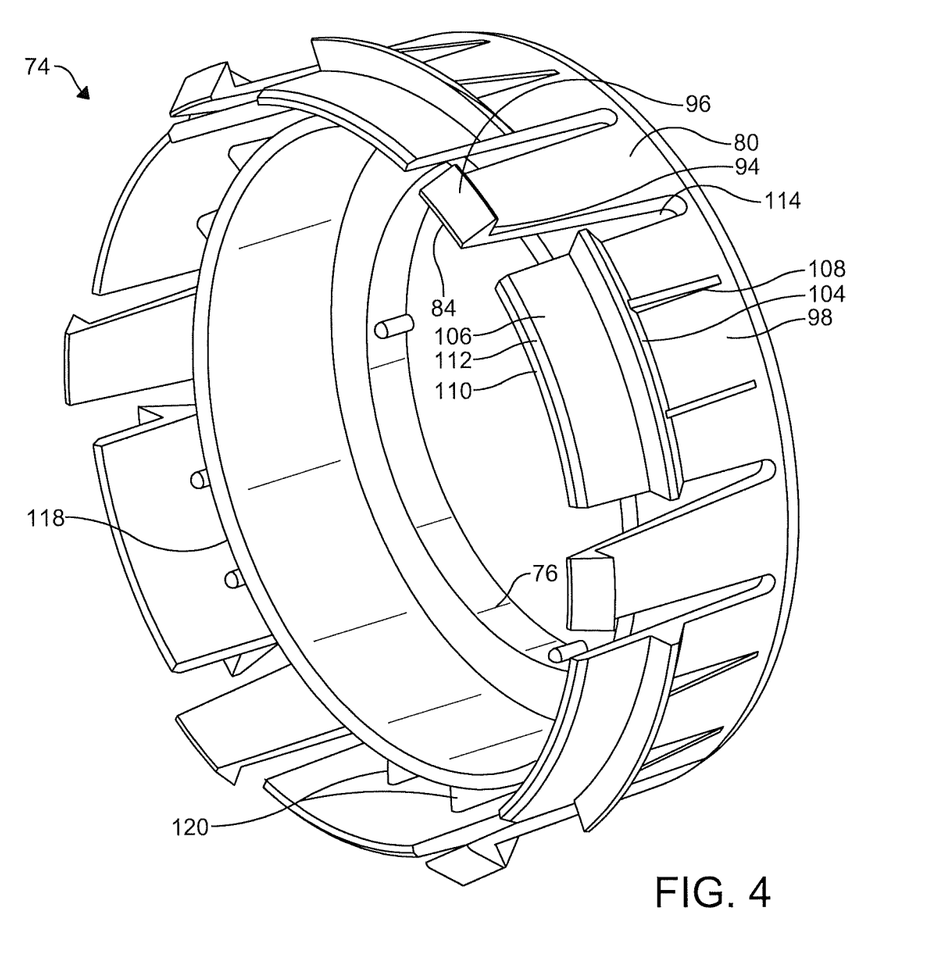
FIG. 4 is a rear perspective view of the portion of the tone wheel assembly of FIG. 3.

Preferably, the first leg portion 80 extends in a circumferential direction from a first side 86 to a second side 88, which is opposite the first side. In an embodiment, the first leg portion 80 comprises a first leg portion protuberance 90. Preferably, the first leg portion protuberance 90 extends in a circumferential direction from the first side 86 to the second side 88 of the first leg portion 80. Preferably, the first leg portion protuberance 90 is provided on an outer surface 92 of the first leg portion 80 at or near the end 84 of the first leg portion 80. Preferably, the thickness of the first leg portion protuberance 90 gradually increases toward the first end 82 of the first leg portion 80. Referring now to FIG. 4, the first leg portion protuberance 90 extends radially from the outer surface 92 of the first leg portion 90. More particularly, the first leg portion protuberance 90 has a first surface 94 that extends radially from the outer surface 92 of the first leg portion 80. In an embodiment, the first surface 94 is provided in a perpendicular relationship with the outer surface 92 of the first leg portion 80. In some embodiments, the first leg portion protuberance 90 has a second surface 96 that extends axially from the first surface 94 toward the second end 84 of the first leg portion 80. In one such embodiment, the second surface 96 is ramped. In this embodiment, the thickness of the first leg portion protuberance 90 may gradually decrease from the first surface 94 toward the second end 84 of the first leg portion 80. The second surface 96 may be provided at an oblique angle with respect to the first surface 94 of the first leg portion protuberance 90 and the outer surface 92 of the first leg portion 80. In an embodiment, the first leg portion protuberance 90 may be configured as a right triangle. However, it should be appreciated that the first leg portion protuberance 90 can be configured in another manner.

One or more second leg portions 98 extend in an axial direction from the collar portion 76. Preferably, the one or more second leg portions 98 comprise a plurality of second leg portions. In some embodiments, like the one illustrated in FIG. 3, a first leg portion 80 is positioned between adjacent second leg portions 98 or vice versa. Preferably, in one such embodiment, the first leg portions 80 and second leg portions 98 are provided in an alternating arrangement about the perimeter of the collar portion 76. In an embodiment, the one or more first leg portions 80 are of a length that is greater than a length of the one or more second leg portions 98.

As illustrated, each second leg portion 98 provided may be similarly configured. Thus, for describing certain embodiments, only one second leg portion 98 may be described below.

Preferably, the second leg portion 98 extends in a circumferential direction from a first side 100 to a second side 102, which is opposite the first side 100. In an embodiment, the second leg portion 98 comprises a second leg portion protuberance 104. Preferably, the second leg portion protuberance 104 is provided on the outer surface 106 of the second leg portion 98 and extends radially therefrom. The second leg portion protuberance 104 may extend in a circumferential direction from the first side 100 to the second side 102 of the second leg portion 98. The second leg portion protuberance 104 may be supported by one or more axial extending ribs 108. As illustrated best in FIG. 3, two axial extending ribs 108 may be provided on the outer surface 106 of the second leg portion 98. In some embodiments, the second leg portion 98 has an end 110 that, when the tone wheel assembly 40 is installed, is an inboard end of the second leg portion 98 and is attached to the outer surface 106 of the second leg portion 98 by way of a chamfered surface 112, which is illustrated best in FIG. 4.

Preferably, an opening 114 is provided between the first leg portion 80 and the second leg portion 98. More preferably, an opening 114 is provided between each first leg portion 80 and the adjacent second leg portion 98. In some embodiments, each opening 114 is at least partially defined by adjacent first and second leg portions 80, 98. Each opening 114 has a width that may gradually increase toward the first end of second member 74. After installation, lubricant can pass through the opening(s) 114. Passage of the lubricant through the opening(s) 114 enables lubrication of the axle shaft 30, differential 24, and differential bearing 42.

Referring back to FIG. 2, in an embodiment, the second member 74 is attached to the bearing adjuster 46. In this embodiment, the second member 74 may be attached to an inner lip 116 of the bearing adjuster 46. Preferably, the second member 74 is attached to the bearing adjuster 46 adjacent the inboard end of the tone wheel assembly 40. When the one or more first leg portions 80 are of a length that is greater than the length of the one or more second leg portions 98, the second member 74 can be attached to the bearing adjuster 46 through a snap-fit. Preferably, in this embodiment, each first leg portion protuberance 90 is positioned on an inboard side of the bearing adjuster 46 and the second leg portion protuberance 104 is positioned on an outboard side of the bearing adjuster 46. In this embodiment, each first leg portion protuberance 90 helps to prevent the tone wheel assembly 40 from moving away from the bearing adjuster 46 during operation of the axle assembly 10 and each second leg portion protuberance 104 acts as a positive stop, which helps insure that the tone wheel assembly 40 is installed in a desired location relative to the bearing adjuster 46 and tone wheel sensor 53.

Figure 9:
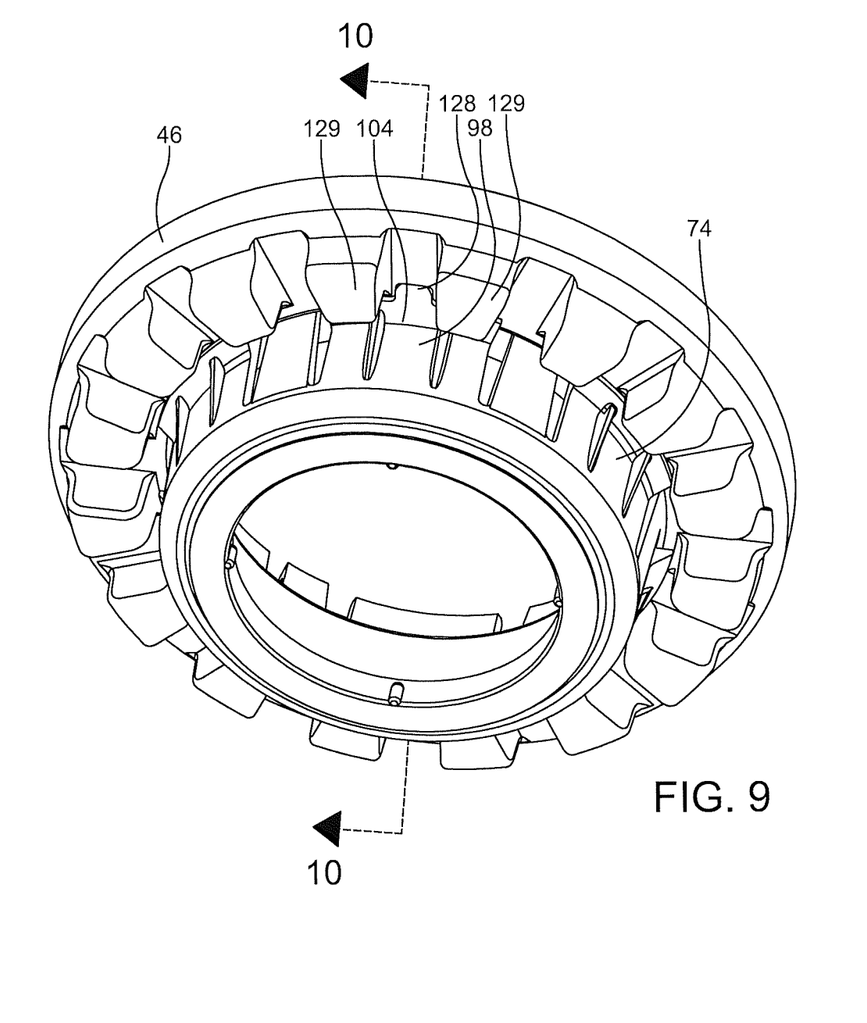
FIG. 9 is a front perspective view of an embodiment of a portion of a tone wheel assembly and axle assembly in accordance with the invention.
Figure 10:
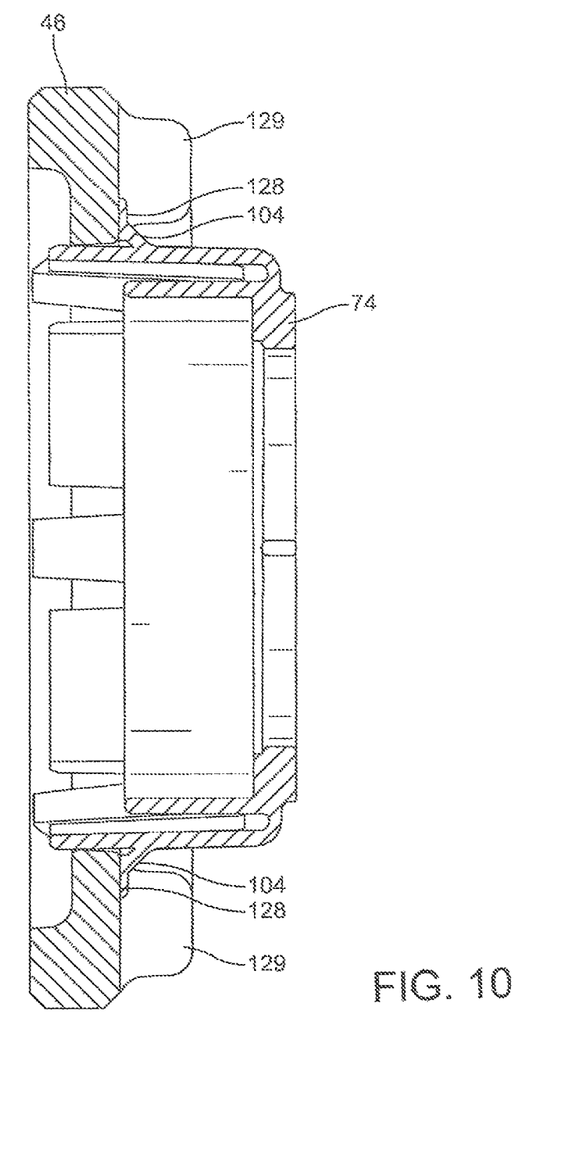
FIG. 10 is a sectional view through the portion of the tone wheel assembly and axle assembly in FIG. 9 along line 10-10.

In some embodiments, like those illustrated in FIGS. 9-10, the second member 74 may be prevented from rotating with respect to the bearing adjuster 46. In these embodiments, at least one second leg portion protuberance 104 may include an anti-rotation projection 128. In the embodiments illustrated, two second leg portion protuberances 104 are provided with anti-rotation projections 128. When two second leg portion protuberances 104 are provided with anti-rotation projections 128, the second leg portion protuberances 104 having anti-rotation projections 128 may be circumferentially spaced apart around the second member 74. In some embodiments, the second leg portion protuberances 104 having anti-rotation projections 128 may be provided on opposite sides of the second member 74 from each other. However, the second leg portion protuberances 104 having anti-rotation projections 128 may be positioned differently on the second member 74.

Preferably, each anti-rotation projection 128 extends radially out from a second leg portion protuberance 104. When the second member 74 is attached to the bearing adjuster 46, each anti-rotation projection 128 is positioned between a pair of lugs 129. Each lug 129 may extend axially from an outboard surface of the bearing adjuster 46. The position of the anti-rotation projection 128 between the lugs 129 prevents the second member 74 from rotating with respect to the bearing adjuster 46.

Figure 7:
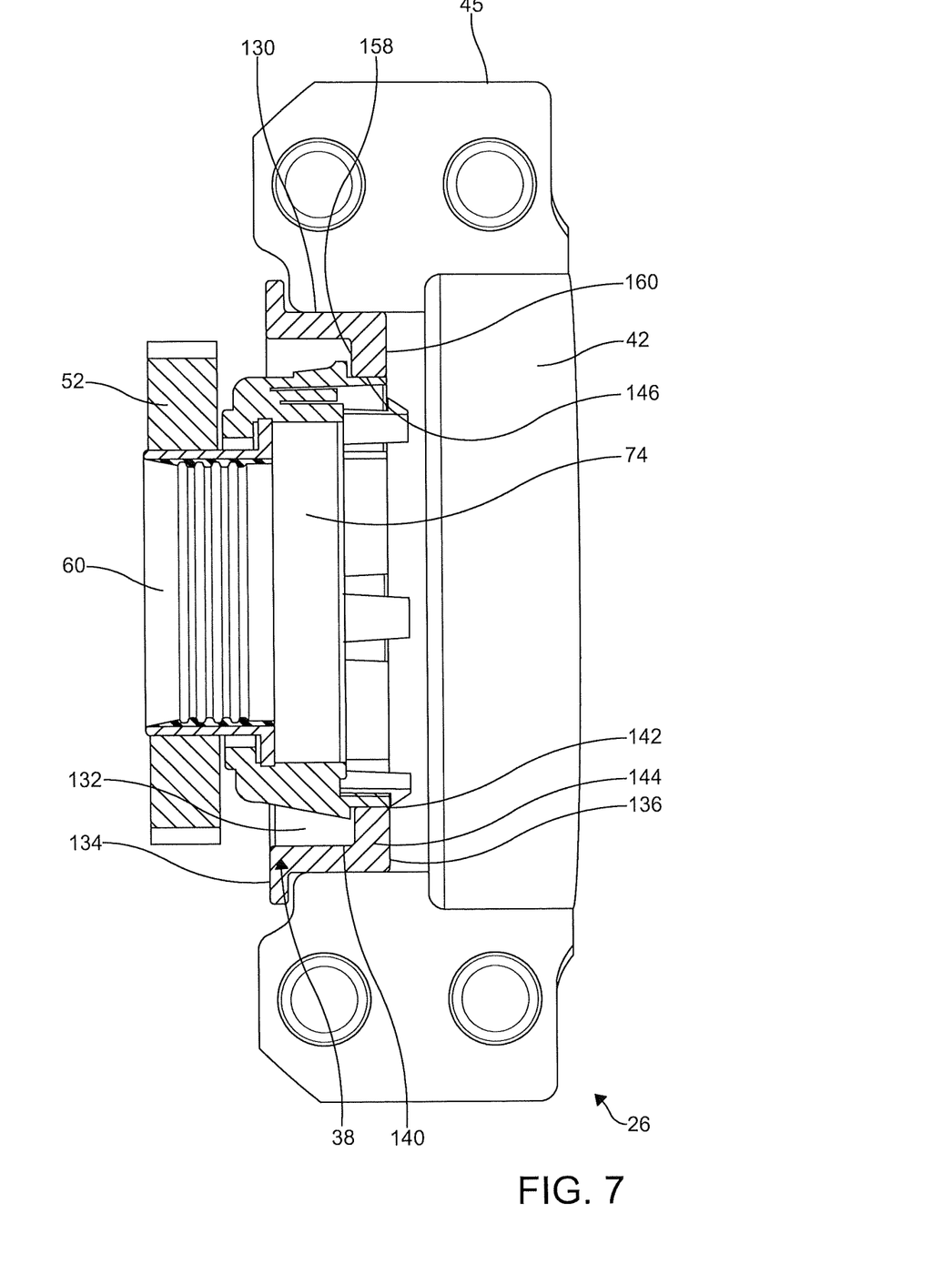
FIG. 7 is a sectional view of an embodiment of an axle assembly in accordance with the invention.
Figure 8:
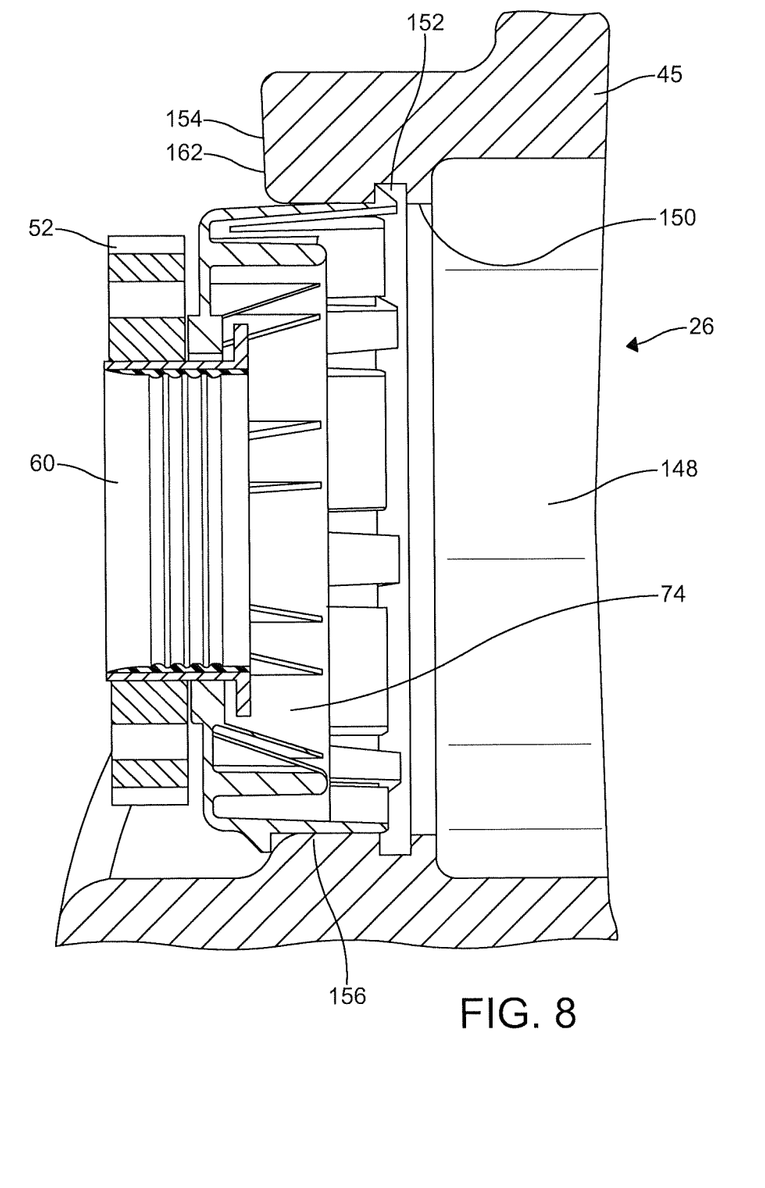
FIG. 8 is a sectional view of another embodiment of an axle assembly in accordance with the invention.

In other embodiments, like those illustrated in FIGS. 7-8, the second member 74 may be connected to the differential carrier portion 26. In some embodiments, the second member 74 is connected to the differential carrier portion 26 by way of another member. In one such embodiment, like the one illustrated in FIG. 7, a ring member 130 may be attached to the differential carrier portion 26. The ring member 130 may be attached to the differential carrier portion 26 by, for example, a press fit or another method. In this embodiment, the ring member 130 is non-rotatable.

The ring member 130 includes an opening 132 that extends from a first end 134 to a second end 136 of the ring member 130. In an embodiment (not depicted), a portion of axle shaft is received by the ring member 130 and extends through the opening 132. In another embodiment, a portion of the second member 74 is received in the opening 132. The opening 132 is defined by an inner surface 138 of the ring member 130 and may include a first diameter portion 140 and a second diameter portion 142. In an embodiment, the first diameter portion 140 is greater than the second diameter portion 142.

The ring member 130 may include an inner lip 144. An inner surface 146 of the inner lip 144 may define the second diameter portion 142. The inner surface 146 may be annular. Preferably, in these embodiments, the second member 74 is received in the opening 132 and attached to the inner lip 144 of the ring member 130. The tone wheel assembly 40 can be attached to the ring member 130 in a manner similar to the manner in which it is attached to a bearing adjuster 46. Thus, in an embodiment, the second member 74 can be attached to the ring member 130 through a snap-fit. Preferably, in this embodiment, the first leg portion protuberance(s) 90 are positioned on an inboard side of the inner lip 144 and the second leg portion protuberance(s) 104 are positioned on an outboard side of the inner lip.

In other embodiments, like the one illustrated in FIG. 8, the second member 74 is attached directly to the differential carrier portion 26. In these embodiments, the differential carrier portion 26 includes an opening 148 that receives a portion of an axle shaft 30, 32 and a portion of the second member 74. The opening 148 is defined by an inner surface 150 of the differential carrier portion 26.

In certain embodiments, a groove 152 is formed in the inner surface 150 of the differential carrier portion 26. Preferably, the groove 152 is annular. The groove 152 is positioned inboard of an outboard end 154 of the differential carrier portion 26. The position of the groove 152 enables an inner lip 156 to be formed on the differential carrier portion 26. In this embodiment, the second member 74 is attached to the inner lip 156 of the differential carrier portion 26. The presence of the inner lip 156 enables the tone wheel assembly 40 to be attached to the differential carrier portion 26 through a snap-fit. Preferably, in this embodiment, the first leg portion protuberance(s) 90 are positioned on an inboard side of the inner lip 156 and the second leg portion protuberance(s) 104 are positioned on an outboard side of the inner lip. Also, in this embodiment, the second leg portion protuberance(s) 104 may abut the outboard end 154 of the differential carrier portion 26. In these embodiments, each first leg portion first leg portion protuberance 90 helps to prevent the tone wheel assembly 40 from moving away from the differential carrier portion 26 during operation of the axle assembly 10 and each second leg portion protuberance 104 acts as a positive stop, which helps insure that the tone wheel assembly 40 is installed in a desired location relative to the differential carrier portion and tone wheel sensor 53.

Figure 5:
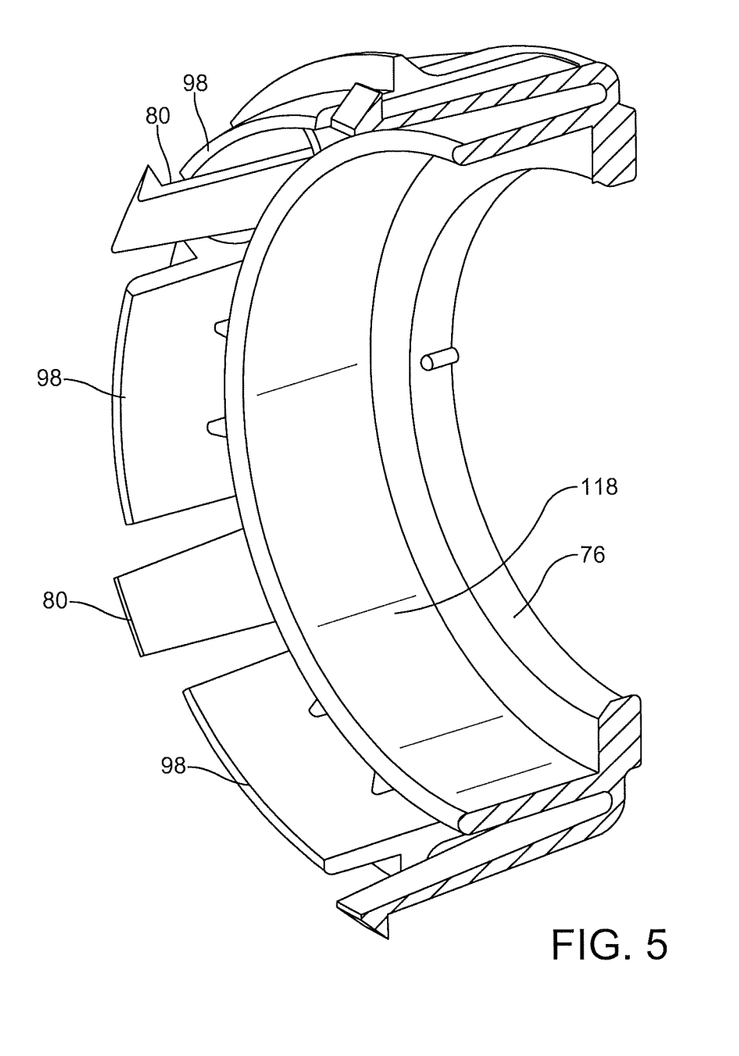
FIG. 5 is a sectional view through the portion of the tone wheel assembly along line 5-5 in FIG. 4.

As best illustrated in FIGS. 4-5, in some embodiments, the second member 74 may comprise an annular rib portion 118. Preferably, the annular rib portion 118 extends in an axial direction from the collar portion 76. The annular rib portion 118 defines an inner diameter that is greater than the inner diameter defined by the collar portion 76. In some embodiments, like the one illustrated in FIG. 6, the annular rib portion 118 is connected to the collar portion 76 by one or more supports 119. The one or more supports 119 may comprise a plurality of supports. When a plurality of supports are provided, the supports 119 may be provided circumferentially about the inner diameter defined by the annular rib portion 118.

Figure 6:
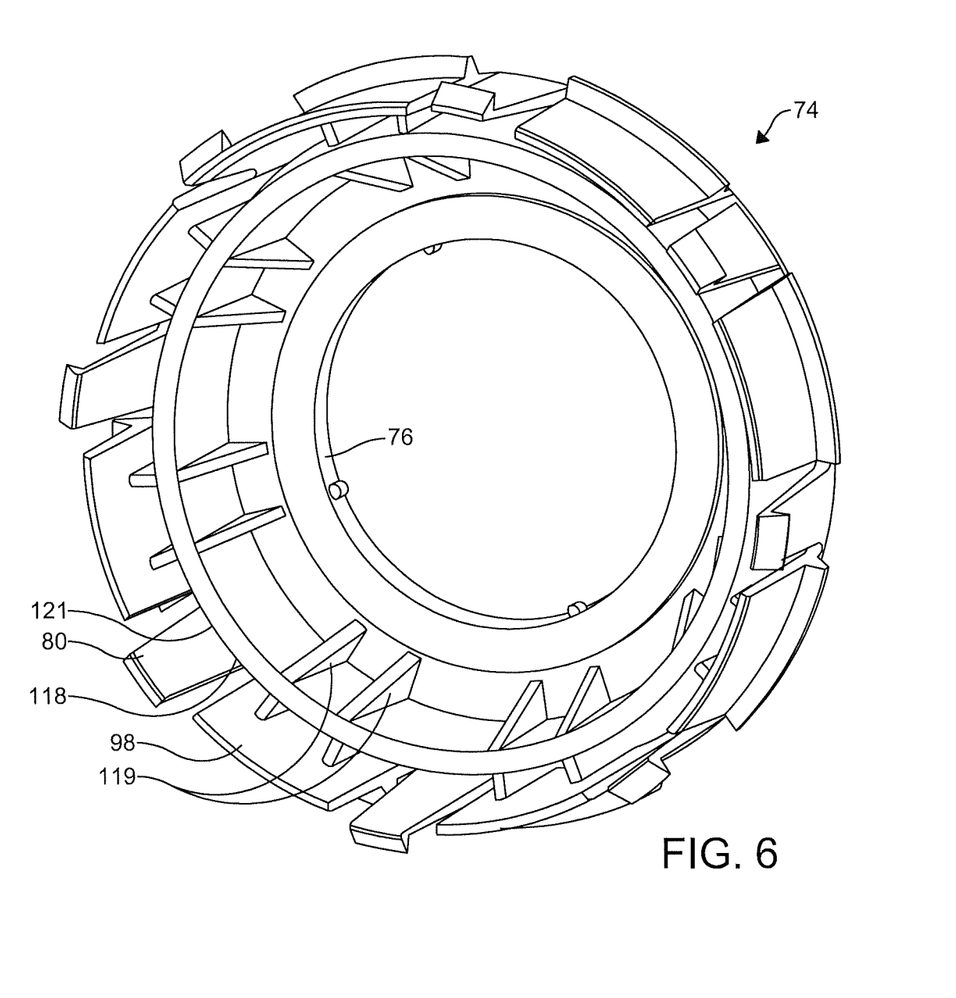
FIG. 6 is a rear perspective view of another embodiment of a portion of the tone wheel assembly in accordance with the invention.

The configuration of only one support will be described below. When a plurality of supports are provided, each support 119 may be similarly configured. The support 119 may extend axially from the collar portion 76 toward an end 121 of the annular rib portion 118. Additionally, the support 119 may gradually reduce in thickness from the collar portion 76 toward the end 121 of the annular rib portion 118. In some embodiments, the support 119 may have the shape of a right triangle. However, in other embodiments (not depicted), the support may be shaped differently.

Referring back to FIGS. 4-5, the one or more first leg portions 80 and the one or more second leg portions 98 are provided about the perimeter of the annular rib portion 118. In some embodiments, the annular rib portion 118 is connected to the one or more first leg portions 80 and the one or more second leg portions 98 by one or more radial extending supports 120. In these embodiments, the annular rib portion 118 provides support for the one or more first leg portions 80 and the one or more second leg portions 98.

In some embodiments, the second member 74 may be formed from a resilient material. Forming the second member 74 from a resilient material enables the first leg portions 80 to flex in a radial direction as they pass under the bearing adjuster 46 during installation of the tone wheel assembly 40 and attach the second member 74 to the bearing adjuster 46. A preferred material for forming the second member 74 is a polymeric material. A preferred polymeric material is polyamide. In some embodiments, the polymeric material may include a reinforcing material such as, for example, glass fibers. However, other materials may be utilized to form the second member 74 or as reinforcing materials.

Advantageously, the tone wheel assembly 40 allows the tone wheel 52 to be positioned within the axle housing 12 adjacent the differential carrier portion 26 and away from the wheel. Thus, the tone wheel assembly 40 provides an axle assembly 10 that is less likely to suffer tone wheel damage. When service is required, the configuration of the tone wheel assembly 40 allows the assembly to be removed efficiently. In the embodiments illustrated in FIGS. 1-2, the tone wheel assembly 40 is removed by first removing the bearing cap 44 and then disconnecting the tone wheel assembly 40 from the bearing adjuster 46. A tool (not depicted) or another member may be utilized to disconnect the tone wheel assembly 40 from the bearing adjuster 46. In other embodiments, like those illustrated in FIGS. 7-8, the tone wheel assembly 40 is removed from the axle assembly 10 by disconnecting the tone wheel assembly 40 from the differential carrier portion 26 or another member within the axle housing 12.

The tone wheel assembly 40 also provides a method of manufacturing an axle assembly 10 that is less complex than the known methods. For example, in some embodiments, the method allows the preload and backlash on a differential bearing 42 to be set before the tone wheel assembly 40 is installed, which reduces the complexity of manufacturing the axle assembly 10 and the risk that the tone wheel 52 will be damaged when the bearing 42 is preloaded.

In some embodiments, the method may comprise providing a pinion gear (not depicted). The pinion gear is received by at least a portion of the differential carrier portion 26. The pinion gear may be attached to the input shaft and mounted for rotation therewith. Rotation of the pinion gear may be supported by bearings disposed around the input shaft.

The differential carrier portion 26 may receive the differential 24. The differential 24 is received in at least a portion of the differential carrier portion 26 near the pinion gear so that the pinion gear can meshingly engage with the ring gear 34 during operation of the axle assembly 10 and drive the differential housing 36. As noted above, the ring gear 34 is secured to the differential housing 36.

The differential bearings 42 are provided and may be positioned around separate portions of the differential housing 36. The method may also include providing one or more bearing adjusters 46. The preload on each differential bearing 42 may be set as desired utilizing a bearing adjuster 46. A bearing cap 44 may be disposed around each differential bearing 42. Each bearing cap 44 may be installed utilizing a bolt or another fastener. Separate bearing adjuster locks (not depicted) may be received in the differential carrier portion 26 and positioned therein to prevent each bearing adjuster 46 from rotating out of position.

In embodiments like the one illustrated in FIG. 7, where the ring member 130 is provided, the ring member 130 is received in the differential carrier portion 26 and may be aligned with an opening therein. Once positioned as desired, the ring member 130 is urged toward the differential carrier portion 26 and attached thereto. After the ring member 130 and the differential carrier portion 26 are attached, the inner lip 144 of the ring member 130 extends radially in from the differential carrier portion 26. In embodiments like the one illustrated in FIG. 8, where the ring member 130 is not provided and it is desired to attach a tone wheel assembly 40 to the differential carrier portion 26, the groove 152 described above may be formed in an inner surface 150 of the differential carrier portion 26, which forms the inner lip 156 on the differential carrier portion 26. The inner lip 156 extends radially in from the differential carrier portion 26.

Next, one or more tone wheel assemblies 40 are provided. In certain embodiments, two tone wheel assemblies are installed. Preferably, each tone wheel assembly 40 is installed in a similar manner. Thus, installation of only one tone wheel assembly 40 will be described below. However, it should be appreciated that when two tone wheel assemblies are provided that each may be installed in a manner similar those described below.

In some embodiments, the method may comprise aligning an axis of rotation of a tone wheel assembly 40 with an axis of rotation of a bearing adjuster 46. Once the tone wheel assembly 40 is aligned with a bearing adjuster 46, the one or more tone wheel assemblies 40 may be installed by directing each tone wheel assembly toward the differential carrier portion 26 and a respective bearing adjuster 46.

In embodiments where a tone wheel assembly 40 is attached to the ring member 130, the tone wheel assembly 40 may be aligned with the opening 132 in the ring member 130 and then directed toward the ring member 130 and differential carrier portion 26. Similarly, when a tone wheel assembly 40 is attached directly to the differential carrier portion 26, the tone wheel assembly 40 may be aligned with the opening 148 in the differential carrier portion 26 and then directed toward the differential carrier portion 26.

Preferably, the tone wheel assembly 40 is moved toward the differential carrier portion 26 and, in some embodiments, a bearing adjuster 46 in an axial direction. When the ring member 130 is provided, the tone wheel assembly 40 is moved toward the differential carrier portion 26 in an axial direction. If two tone wheel assemblies 40 are included in the axle assembly 10, the tone wheel assemblies 40 may be moved in an axial direction toward each other. In an embodiment, each tone wheel assembly 40 may be directed toward a bearing adjuster 46 from opposite sides of the differential carrier portion 26. Movement of the tone wheel assemblies 40 toward each other may occur in a simultaneous manner.

In some embodiments, the tone wheel assembly 40 is moved in an axial direction until the second member 74 is attached to the bearing adjuster 46. It should be noted that in these embodiments the method allows the tone wheel assembly 40 to be attached to the bearing adjuster 46 without directing the tone wheel 52 through the bearing adjuster 46. This feature allows tone wheels with outer diameters that are greater than an inner diameter of bearing adjuster, which is illustrated in FIG. 2, to be utilized in the axle assembly 10. In other embodiments, the tone wheel assembly 40 is moved in an axial direction until the second member 74 is attached to the ring member 130 or directly to the differential carrier portion 26.

In embodiments where the second member 74 is attached to the bearing adjuster 46 and prior to the second member 74 attaching to the bearing adjuster 46, one or more of the one or more first leg portions 80 contact the bearing adjuster 46. More particularly and in some embodiments, a first leg portion protuberance 90 on one or more of the one or more first leg portions 80 contacts an outboard surface 122 of the inner lip 116, which is illustrated best in FIG. 2, which causes a portion of the first leg portion 80 to flex inward in a radial direction. The tone wheel assembly 40 may continue to move in an axial direction as the first leg portion protuberance 90 contacts an inner surface 124 of the inner lip 116. The inner surface 124 may be annular and defines the inner diameter of the bearing adjuster 46. Once the first leg portion protuberance 90 moves inboard of the inner surface 124, the second end 84 of the first leg portion 80 moves outward in a radial direction so that the first leg portion protuberance 90 is positioned on an inboard side of the inner lip 116. In this position, the first leg portion protuberance 90 is positioned adjacent an inboard surface 126 of the inner lip 116.

While the tone wheel assembly 40 moves in an axial direction, one or more of the one or more second leg portions 98 may contact the inner surface 124 of the inner lip 116. More particularly, a portion of the outer surface 106 of at least one of the one or more second leg portions 98 may contact the inner surface 124 of the inner lip 116. Preferably, movement of the tone wheel assembly 40 in an axial direction is terminated when the outboard surface 122 of the inner lip 116 contacts the second leg portion protuberance(s) 104 of the one or more second leg portions 98. Once the second member 74 is attached to the bearing adjuster 46, each second leg portion protuberance 104 is positioned adjacent the outboard surface 122 of the inner lip 116. In some embodiments, one or more second leg portion protuberances 104 abut the outboard surface 122 of the inner lip 116. In these embodiments and when the second member 74 is attached to the bearing adjuster 46, the inner lip 116 is positioned between at least one first leg portion protuberance 90 and at least one second leg portion protuberance 104.

In embodiments where the second member 74 is attached to the ring member 130 and prior to the second member 74 attaching to the ring member 130, one or more of the one or more first leg portions 80 contact the ring member 130. More particularly and in some embodiments, a first leg portion protuberance 90 on one or more of the one or more first leg portions 80 contacts an outboard surface 158 of the inner lip 144 of the ring member 130, which is illustrated best in FIG. 7, which causes a portion of the first leg portion 80 to flex inward in a radial direction. The tone wheel assembly 40 may continue to move in an axial direction as the first leg portion protuberance 90 contacts the inner surface 146 of the inner lip 144. Once the first leg portion protuberance 90 moves inboard of the inner surface 146, the second end 84 of the first leg portion 80 moves outward in a radial direction so that the first leg portion protuberance 90 is positioned on an inboard side of the inner lip 144. In this position, the first leg portion protuberance 90 is positioned adjacent an inboard surface 160 of the inner lip 144.

While the tone wheel assembly 40 moves in an axial direction, one or more of the one or more second leg portions 98 may contact the inner surface 146 of the inner lip 144. More particularly, a portion of the outer surface 106 of at least one of the one or more second leg portions 98 may contact the inner surface 146 of the inner lip 144. Preferably, movement of the tone wheel assembly 40 in an axial direction is terminated when the outboard surface 158 of the inner lip 144 contacts the second leg portion protuberance(s) 104 of the one or more second leg portions 98. Once the second member 74 is attached to the ring member 130, each second leg portion protuberance 104 is positioned adjacent the outboard surface 158 of the inner lip 144. In some embodiments, one or more second leg portion protuberances 104 abut the outboard surface 158 of the inner lip 144. In these embodiments and when the second member 74 is attached to the ring member 130, the inner lip 144 is positioned between at least one first leg portion protuberance 90 and at least one second leg portion protuberance 104.

In embodiments where the second member 74 is attached directly to the differential carrier portion 26 and prior to the second member 74 attaching to the differential carrier portion 26, one or more of the one or more first leg portions 80 contact the differential carrier portion 26. More particularly and in some embodiments, a first leg portion protuberance 90 on one or more of the one or more first leg portions 80 contacts an outboard surface 162 of the inner lip 156 of the differential carrier portion 26, which is illustrated best in FIG. 8, which causes a portion of the first leg portion 80 to flex inward in a radial direction. As illustrated, the outboard surface 162 of the inner lip 156 may also define an end 154 of differential carrier portion 26. The tone wheel assembly 40 may continue to move in an axial direction as the first leg portion protuberance 90 contacts an inner surface 150 of the inner lip 156. The inner surface 150 may be annular and defines the inner diameter of the inner lip 156 formed on the differential carrier portion 26. Once the first leg portion protuberance 90 moves inboard of the inner surface 150, the second end 84 of the first leg portion 80 moves outward in a radial direction so that the first leg portion protuberance 90 is positioned on an inboard side of the inner lip 156. In this position, the first leg portion protuberance 90 is positioned in the groove 152 formed in the inner surface 150 of the differential carrier portion 26.

While the tone wheel assembly 40 moves in an axial direction, one or more of the one or more second leg portions 98 may contact the inner surface 150 of the inner lip 156. More particularly, a portion of the outer surface 106 of at least one of the one or more second leg portions 98 may contact the inner surface 150 of the inner lip 156. Preferably, movement of the tone wheel assembly 40 in an axial direction is terminated when the outboard surface 162 of the inner lip 156 contacts the second leg portion protuberance(s) 104 of the one or more second leg portions 98. Once the second member 74 is attached to the differential carrier portion 26, each second leg portion protuberance 104 is positioned adjacent the outboard surface 162 of the inner lip 156. In some embodiments, one or more second leg portion protuberances 104 abut the outboard surface 162 of the inner lip 156. In these embodiments and when the second member 74 is attached to the differential carrier portion 26, the inner lip 156 is positioned between at least one first leg portion protuberance 90 and at least one second leg portion protuberance 104.

After installing the tone wheel assemblies 40, the axle shafts 30, 32 are provided and each may be secured to a respective side gear. Also, the axle housing 12 can be formed by attaching the first housing 14 to the second housing 16 or in another manner.

The foregoing description is considered as illustrative only of the principles of the invention. Further, since numerous modifications and changes will readily occur to those skilled in the art, it is not desired to limit the invention to the exact construction and processes shown and described herein. Accordingly, all suitable modifications and equivalents may be considered as falling within the scope of the invention as defined by the claims, which follow.

The invention claimed is:

1. A tone wheel assembly, comprising:
    a tone wheel;
    a first member attached to the tone wheel; and
    a second member at least partially disposed around a portion of the first member, the second member comprising a collar portion, one or more first leg portions extending axially from the collar portion, and one or more second leg portions extending axially from the collar portion, wherein the one or more first leg portions include a first leg portion protuberance that extends radially from an outer surface of the one or more first leg portions and the one or more second leg portions include a second leg portion protuberance that extends radially from an outer surface of the one or more second leg portions.

2. The tone wheel assembly of claim 1, wherein the first member includes a first wall portion and a second wall portion and the collar portion defines an inner diameter that is greater than an outer diameter of the first wall portion and less than an outer diameter of the second wall portion.

3. The tone wheel assembly of claim 1, wherein at least one of the one or more first leg portions extend in a circumferential direction and at least one of the one or more second leg portions extend in a circumferential direction.

4. The tone wheel assembly of claim 1, wherein the one or more first leg portions are of a length that is greater than a length of the one or more second leg portions.

5. The tone wheel assembly of claim 1, further comprising an annular rib portion that extends in an axial direction from the collar portion.

6. The tone wheel assembly of claim 1, wherein a thickness of the first leg portion protuberance decreases toward an end of the one or more first leg portions.

7. The tone wheel assembly of claim 1, wherein at least one of the one or more second leg portions further includes an end that is attached to a chamfered surface, the chamfered surface being attached to the outer surface of the one or more second leg portions.

8. The tone wheel assembly of claim 1, further comprising an opening provided between the one or more first leg portions and the one or more second leg portions, the opening having a width that decreases toward an end of the second member.

9. An axle assembly comprising the tone wheel assembly of claim 1.

10. The axle assembly of claim 9, wherein the second member is attached to a bearing adjuster such that the first leg portion protuberance is positioned on an inboard side of the bearing adjuster and the second leg portion protuberance is positioned on an outboard side of the bearing adjuster.

11. The axle assembly of claim 9, further comprising a ring member that includes an inner lip, the second member being attached to the inner lip of the ring member such that the first leg portion protuberance is positioned on an inboard side of the inner lip and the second leg portion protuberance is positioned on an outboard side of the inner lip.

12. The axle assembly of claim 9, further comprising a differential carrier portion that includes an inner lip, the second member being attached to the inner lip of the differential carrier portion such that the first leg portion protuberance is positioned on an inboard side of the inner lip and the second leg portion protuberance is positioned on an outboard side of the inner lip.

13. The axle assembly of claim 10, wherein the bearing adjuster has an inner diameter and an outer diameter of the tone wheel is greater than the inner diameter of the bearing adjuster.

14. A method of manufacturing an axle assembly, comprising:
    providing a tone wheel assembly comprising a portion having one or more first leg portions and one or more second leg portions, wherein the one or more first leg portions include a first leg portion protuberance that extends radially from an outer surface of the one or more first leg portions and the one or more second leg portions include a second leg portion protuberance that extends radially from an outer surface of the one or more second leg portions;
    attaching the tone wheel assembly to a portion of an axle assembly comprising an inner lip, the first leg portion protuberance being positioned on an inboard side of the inner lip and the second leg portion protuberance being positioned on an outboard side of the inner lip.

15. The method of claim 14, further comprising providing a bearing around a portion of a differential housing, preloading the bearing utilizing a bearing adjuster, and attaching the tone wheel assembly to the bearing adjuster.

16. The method of claim 14, further comprising forming a groove in an inner surface of a differential carrier portion and positioning the first leg portion protuberance in the groove.

17. The method of claim 14, further comprising providing a ring member and attaching the ring member to a differential carrier portion, the inner lip being provided as a portion of the ring member.

18. The method of claim 14, further comprising aligning the tone wheel assembly with an opening providing in a differential carrier portion and directing the tone wheel assembly in an axial direction toward the differential carrier portion.

* * * * *